United States Patent [19]
Edmonds, Jr. et al.

[11] Patent Number: 5,329,796
[45] Date of Patent: * Jul. 19, 1994

[54] ROD STAMPING MACHINE

[75] Inventors: Richard F. Edmonds, Jr., Sellersville; William C. Sholly, Souderton, both of Pa.

[73] Assignee: SRW Associates, Inc., Wilmington, Del.

[*] Notice: The portion of the term of this patent subsequent to May 11, 2010 has been disclaimed.

[21] Appl. No.: 18,211

[22] Filed: Feb. 16, 1993

Related U.S. Application Data

[62] Division of Ser. No. 846,708, Mar. 6, 1992, Pat. No. 5,209,094.

[51] Int. Cl.⁵ .................................... B21C 26/00
[52] U.S. Cl. ................................................ 72/71
[58] Field of Search ............... 72/71, 72, 70, 341, 72/453.11, 453.1, 464; 29/26 A, 26 R; 408/30, 32, 24; 101/3.1, 4

[56] References Cited

U.S. PATENT DOCUMENTS

| | | | |
|---|---|---|---|
| 2,427,358 | 9/1947 | Kovach | 72/453.11 |
| 2,483,799 | 10/1949 | Veit et al. | 72/71 |
| 3,648,500 | 3/1972 | Vaill | 72/71 |
| 3,762,484 | 10/1973 | Speicher | 101/3.1 |
| 3,800,581 | 4/1974 | Summerlin et al. | 72/71 |
| 3,847,078 | 11/1974 | Krembel, Jr. | 101/3.1 |
| 3,882,772 | 5/1975 | Geisow et al. | 101/4 |
| 4,269,090 | 5/1981 | Ingber et al. | 101/4 |
| 4,401,030 | 8/1983 | Connolly et al. | 101/4 |

Primary Examiner—Lowell A. Larson
Attorney, Agent, or Firm—Gregory J. Gore

[57] ABSTRACT

A machine combines metal rod chamfering and stamping operations into a single machining operation. Cutting the chamfer on the end of the rod is accomplished by a rotating cutting tool affixed to a chuck which rotates with a spindle about an axis co-linear with the axis of the workpiece. Both the chuck and the spindle contain a hollow bore along their rotational axes. This bore holds a stamping rod which is free to move axially within the spindle. A stamping impact unit is located at the opposite end of the spindle which acts upon the opposite end of the stamping rod. At the desired moment within the chamfering operation, the stamping rod is hammered into the end face of the workpiece by the impact unit. The imprint end of the stamping rod functions as a mechanical stop to locate the depth the workpiece is inserted into a clamping collet.

12 Claims, 6 Drawing Sheets

ROD STAMPING MACHINE

This is a division of application Ser. No. 07/846,708, filed Mar. 6, 1992, now U.S. Pat. No. 5,209,094, issued May 11, 1993.

FIELD OF THE INVENTION

This invention relates to metal turning and forming machinery. More specifically, the invention relates to a machine with a rotating tool which cuts a workpiece and simultaneously imprints the workpiece by stamping an identification code into the end of the workpiece. The stamp is synchronized with the rotating tool to combine a chamfering and stamping process into a single machining operation.

BACKGROUND OF THE PRIOR ART

Chamfering the end of metal rod stock is a commonly performed metalworking operation. Chamfering removes sharp edges from the end of the rod and may also serve as a tapered thread lead at the end of the rod when the rod is threaded. Another commonly employed machining operation is stamping the circular end face of the rod with a punch which imprints identification indicia relating to the processed part.

Heretofore, these machining operations have been carried out by separate machines, usually located at different places on the shop floor. When the workpieces are large and heavy, say steel rod stock 1" in diameter and 10" long, having the above-mentioned chamfering and stamping steps being carried out separately is inefficient. It requires substantial handling of the individual workpieces and transportation of the work materials between machining stations on the shop floor. This makes separate stamping and chamfering machining operations both time-consuming and labor intensive.

SUMMARY OF THE INVENTION

In order to reduce the time and labor in performing the chamfering and stamping operations described above, the present machine has been invented which combines both of these machining functions into a single machining operation. As will be further explained, the present machine is fast, compact and simple to operate.

The present invention includes a clamping collet which receives the end of a metal, rod-shaped workpiece that may be threaded or unthreaded. Once clamped, a single-step machining operation is initiated which begins by turning the edge around the end of the rod with a rotating cutting tool producing a desired chamfer. At a pre-selected point in the movement of the chamfering tool, an impact unit stamps an identification indicia onto the circular end face of the rod. The workpiece is then released from the stationary clamp and removed from the machine. A machining cycle to accomplish the chamfering and stamping operation typically takes approximately five seconds.

As will be more fully described herein, cutting the chamfer on the end of the rod is accomplished by a rotating cutting tool affixed to a chuck which rotates with a spindle about an axis co-linear with the axis of the workpiece. Both the chuck and the spindle contain a hollow bore along their rotational axes. This bore holds a stamping rod which is free to move axially within the spindle. A stamping impact, unit is located at the opposite end of the spindle which acts upon the opposite end of the stamping rod. At the desired moment within the chamfering operation, the stamping rod is hammered into the end of the workpiece by the impact unit.

More specifically, the applicants have devised a metalworking machine for chamfering and stamping the ends of metal rods, comprising: a base; a releaseable clamp affixed to the base holding a rod-like workpiece in a fixed, stationary position; a hollow spindle rotatably and slideably affixed to the base having an axial throughbore; and a chuck mounted on one end of the spindle and having an axis of rotation co-linear with the longitudinal axis of the workpiece. The device further includes a cutting tool mounted in the chuck; drive means for rotating the spindle; a stamping rod slideably held within the spindle throughbore, the stamping rod including indicia imprint means on a first end and impact means affixed to the base beyond a second end of the spindle and acting upon a second end of the stamping rod. Advance means affixed between the base and the spindle moves the chuck back and forth, the advance means also being connected to the impact means, whereby the advancement of the chuck causes the cutting tool to chamfer the edges of the workpiece. At a pre-selected point of advancement, the advance means triggers the impact means to forcibly drive the stamping rod forward, thereby producing an identification mark in the end of the workpiece. This is achieved with the workpiece placed and clamped in abutment with the stamping rod and where there is no clearance between the stamping rod and the impact means, thereby the stamping rod functions as a stop to position the depth of the workpiece in the clamp.

DESCRIPTION OF THE PREFERRED EMBODIMENT

Figure 1:
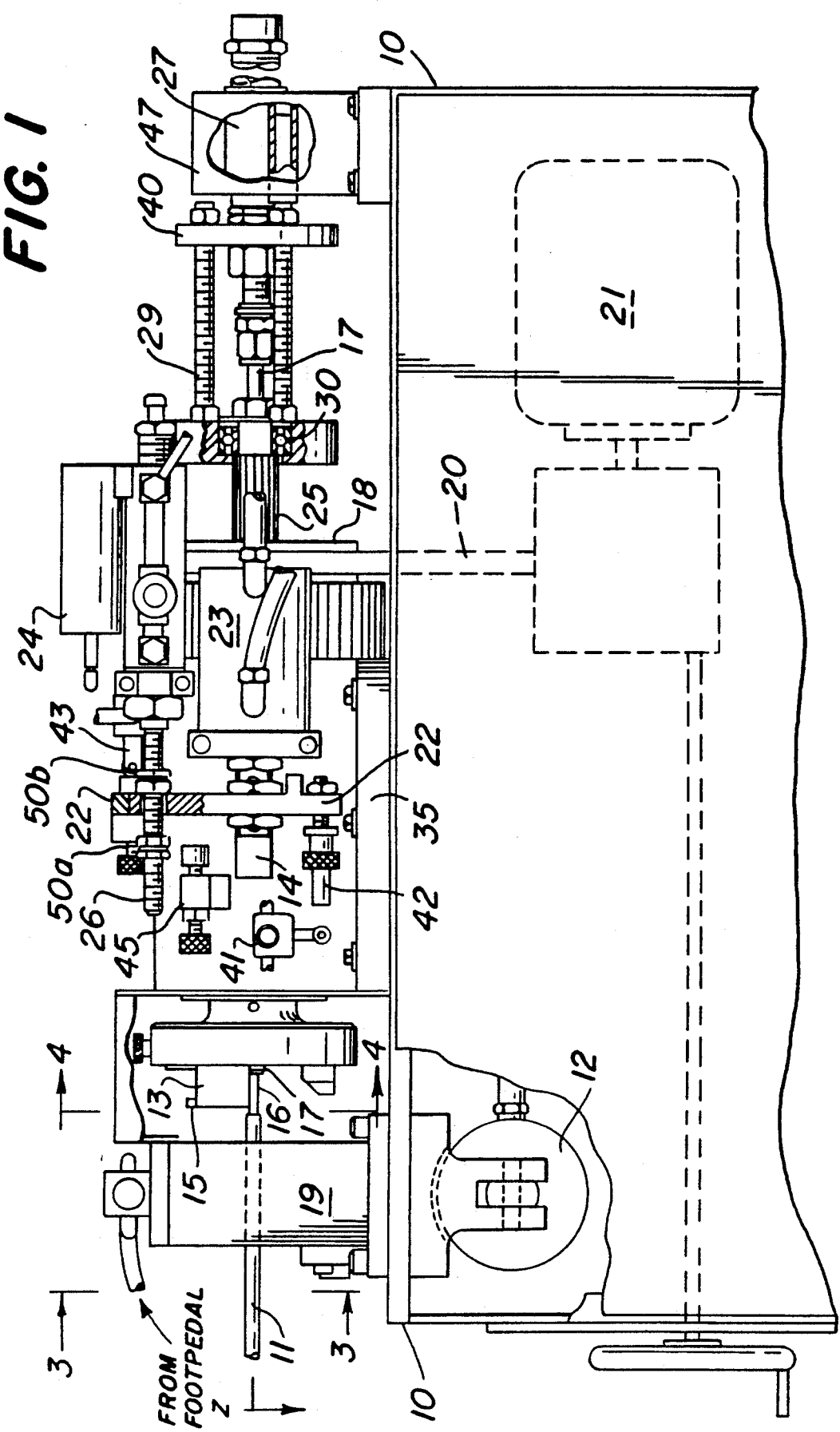
FIG. 1 is a side view of the present invention.

Referring now to FIG. 1, all major components of the present machine are mounted upon base 10. Rotary motion is imparted to the spindle and chuck by motor 21 which is connected to the spindle through belt 20 which drives pulley 18. Beginning from the left side of the invention shown in this figure, workpiece 11 is held by clamp 19 which is shown in greater detail in FIG. 3. Chuck 13 holds cutting tool 15 and all rotational elements of the chuck and spindle are supported by housing 35 which is mounted to base 10.

Advance means 23 is a pneumatic cylinder which applies force to advance plate 22 that is connected by an arm to the spindle through window slot 14 so that actuation of cylinder 23 moves the chuck and spindle assembly back and forth within housing 35. Advance regulator 24 is connected to advance plate 22 by rod 26. Rod 26 is threaded and includes stop nuts 50a and 50b which determine the points at which the advance plate moves rod 26. The advance plate includes a hole which is larger in diameter than rod 26 so that the rod is free to move back and forth between nut stops 50a and 50b. By employing the above-described adjustability, the point of advancement where the regulator becomes active may be controlled. The advance regulator acts to control the advance speed of the chuck and includes an adjustable check valve to set the desired speed.

Advance plate 22 also actuates valve means 41 and 43 which control the reciprocating movement of the spindle and chuck. Lever-actuated limit valve 41 controls the automatic stop and return movement of the chuck and is moved by rod 42 which extends from the advance plate. When the spindle returns to its home position, plunger valve 43 is actuated. Valve 43 directs the air supply to clamp cylinder 12 to open the clamp and release the workpiece. Adjustable mechanical stop 45 contacts advance plate 22 to establish the point of maximum advancement.

Referring now to the right-side portion of FIG. 1, spindle 25 extends beyond the drive pulley 18 on the right side of housing 35 and is affixed to yoke 29 by thrust bearing 30. Stamp rod 17 extends completely through a bore in the spindle to the head of impact unit 27. Yoke plate 40 is connected to the outer housing of the impact unit which is slideably mounted to base 10 by mounting collar The impact unit of the preferred embodiment is a self-actuating compressible trip hammer of the type which is well-known in the machine arts. For example, this may be a self-actuating hammer of the type sold by Mecco Machine, Ltd. of Rochester Road, Ingomar, PA, under the name "Energy Section". Typically, impact units of this type contain a powerful spring which is compressed during the compression of the outer housing and an inner plunger. The compressed spring energy is released to a hammer that slides within the plunger which delivers the impact below at a given release point.

Figure 2:
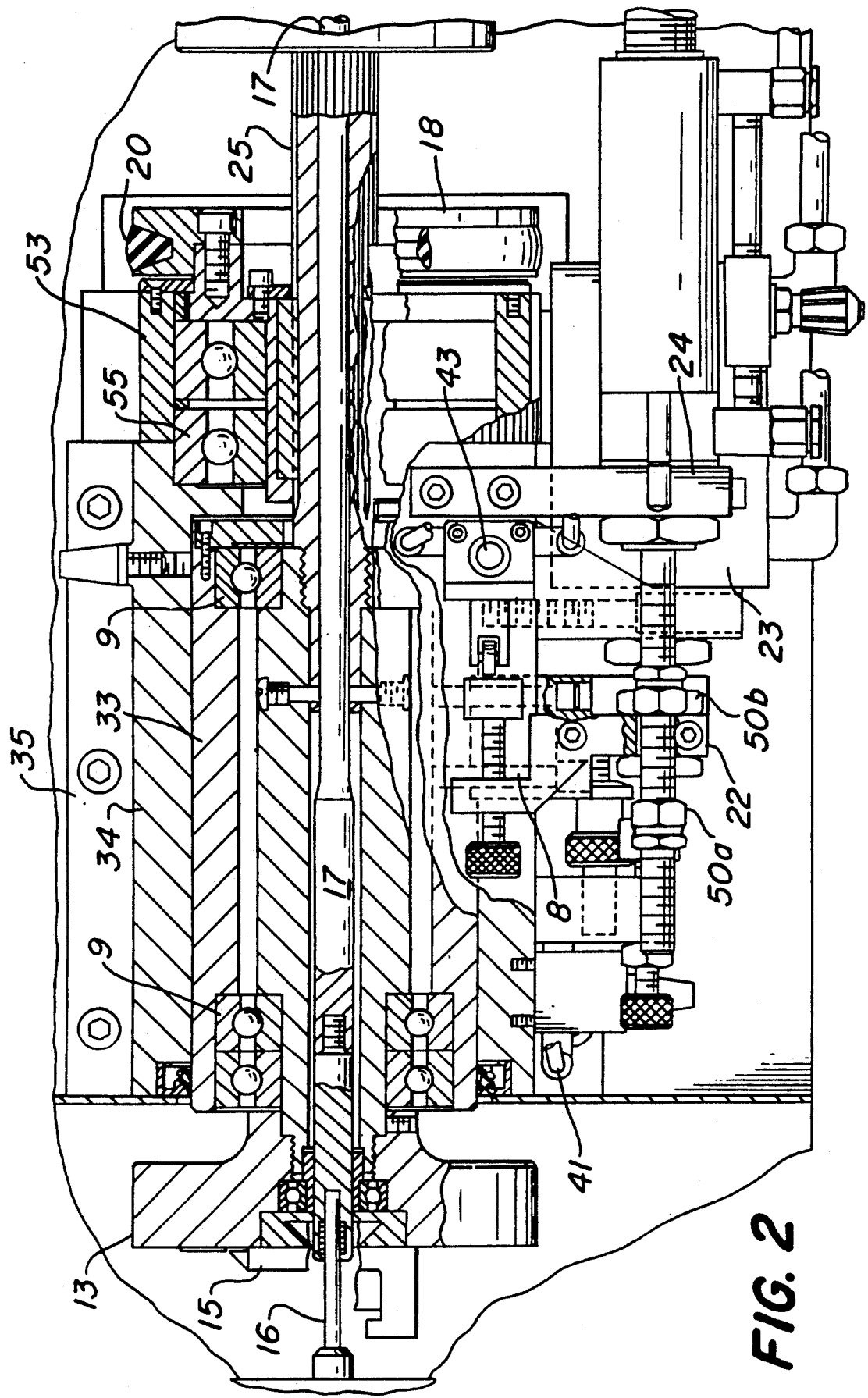
FIG. 2 is a top sectional view taken from FIG. 1 as shown in that figure.

Referring now to FIG. 2, greater detail of the spindle and chuck assembly is shown. Stamp 16 is releaseably held within stamping rod 17. The stamping rod passes completely through spindle 25 and is slideably held in this through-bore. Chuck 13 is threadably secured to the left end of the spindle. Shown at the left side of this figure, the spindle is rotatably mounted and axially retained within thrust collar 33 by way of support bearings 9. The inner wall of housing 35 includes bearing surface 34 which slideably holds the thrust collar.

The right side of spindle shaft is splined and fits within a compatible splined hub of drive pulley 18. The pulley is affixed to a collar 53 which is rotatably affixed to the housing through bearings 55. Advance cylinder 23 is connected to the spindle thrust collar by way of advance plate 22 and arm 8. The advance plate serves both as the mechanical link between advance cylinder 23 and the spindle, as well as actuating the reversing valve 41 and the clamp release valve 43. By these mechanical relations, it will be readily understood that as the thrust collar 33 is moved by cylinder 23, it is operable to move the spindle and chuck assembly, back and forth toward and away from the workpiece, while the drive pulley remains aligned to the drive motor and secured against any axial movement.

Figure 3:
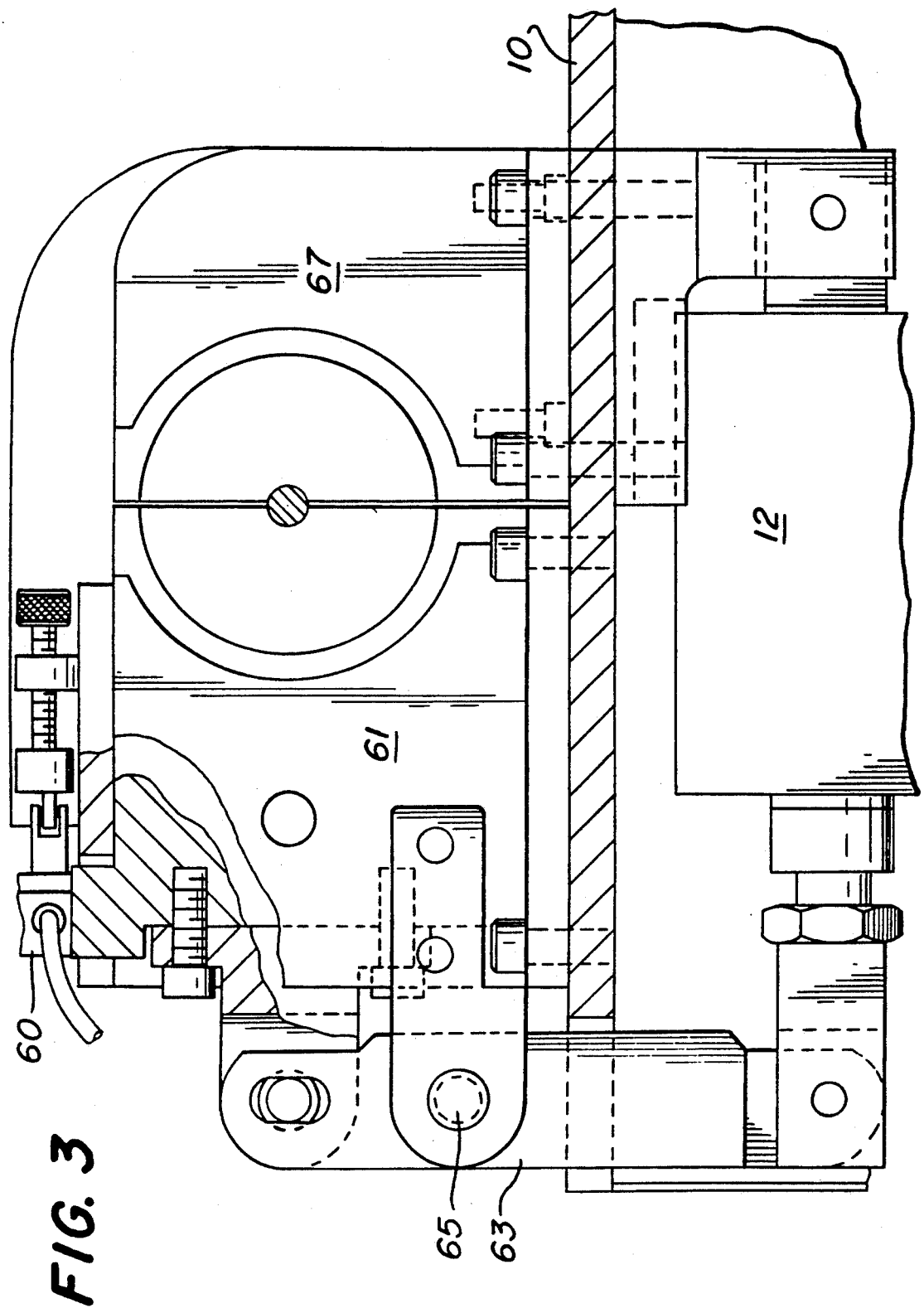
FIG. 3 is a front sectional view taken from FIG. 1 as shown in that figure.

Referring now to FIG. 3, greater detail of the clamp mechanism is shown. The clamp is actuated by pneumatic cylinder 12 which moves the left-side clamp jaw 61 by way of lever 63 which pivots about pin 65. The right-side jaw 67 remains stationary and is bolted directly to base 10. When the jaw is closed, valve 60 directs air to the advance cylinder.

Figure 4:
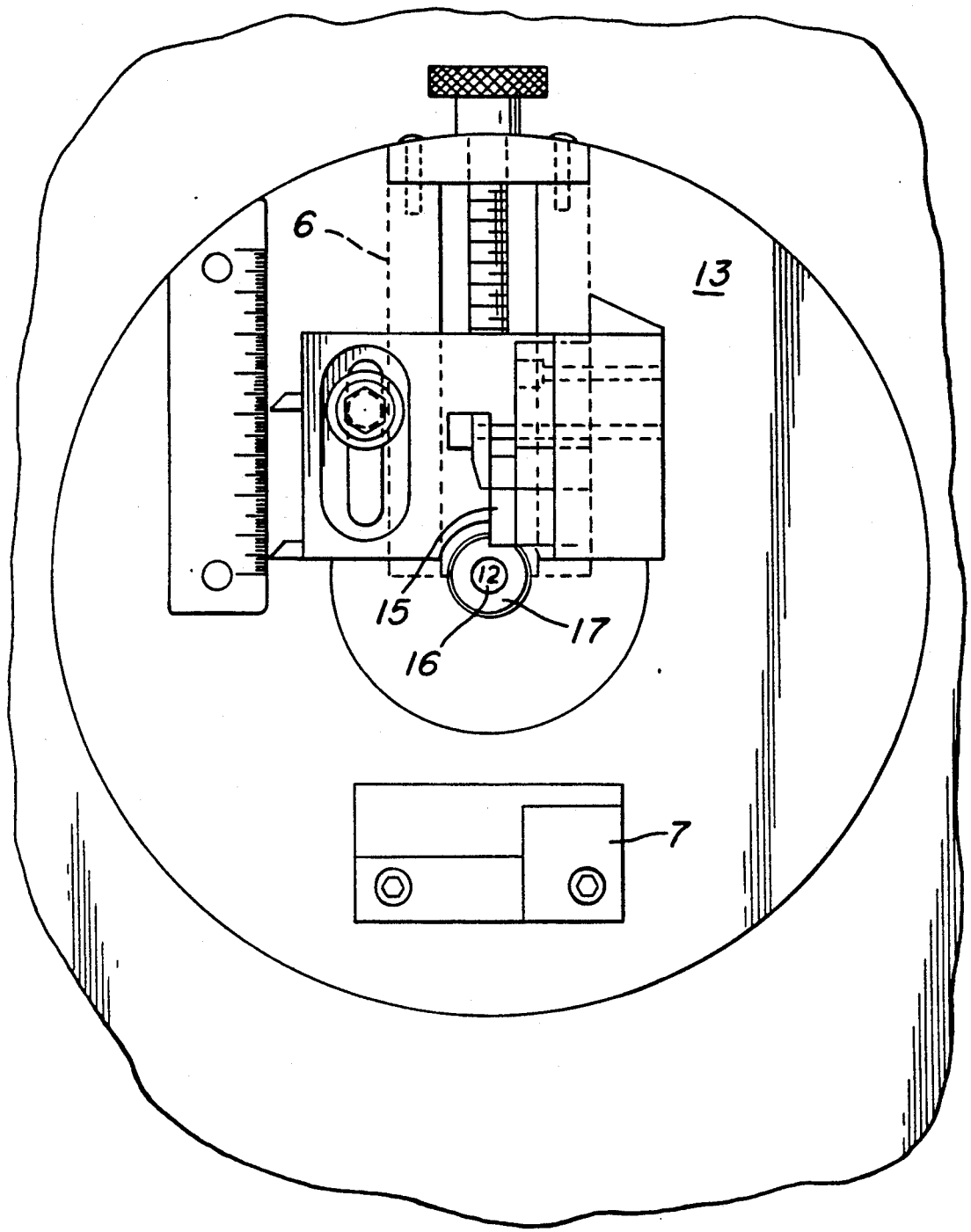
FIG. 4 is a front sectional view taken from FIG. 1 as shown in that figure.

Referring now to FIG. 4, greater detail of the chuck and cutting tool mounting is shown. Chuck 13 carries an adjustable fixture 6 in which cutting tool 15 is mounted. Stamp 16 is affixed to the end of stamp rod 17 and includes an indicia on its end represented by the numeral "12" shown in this figure. Weights 7 counter-balance the tool fixture.

Figure 5:
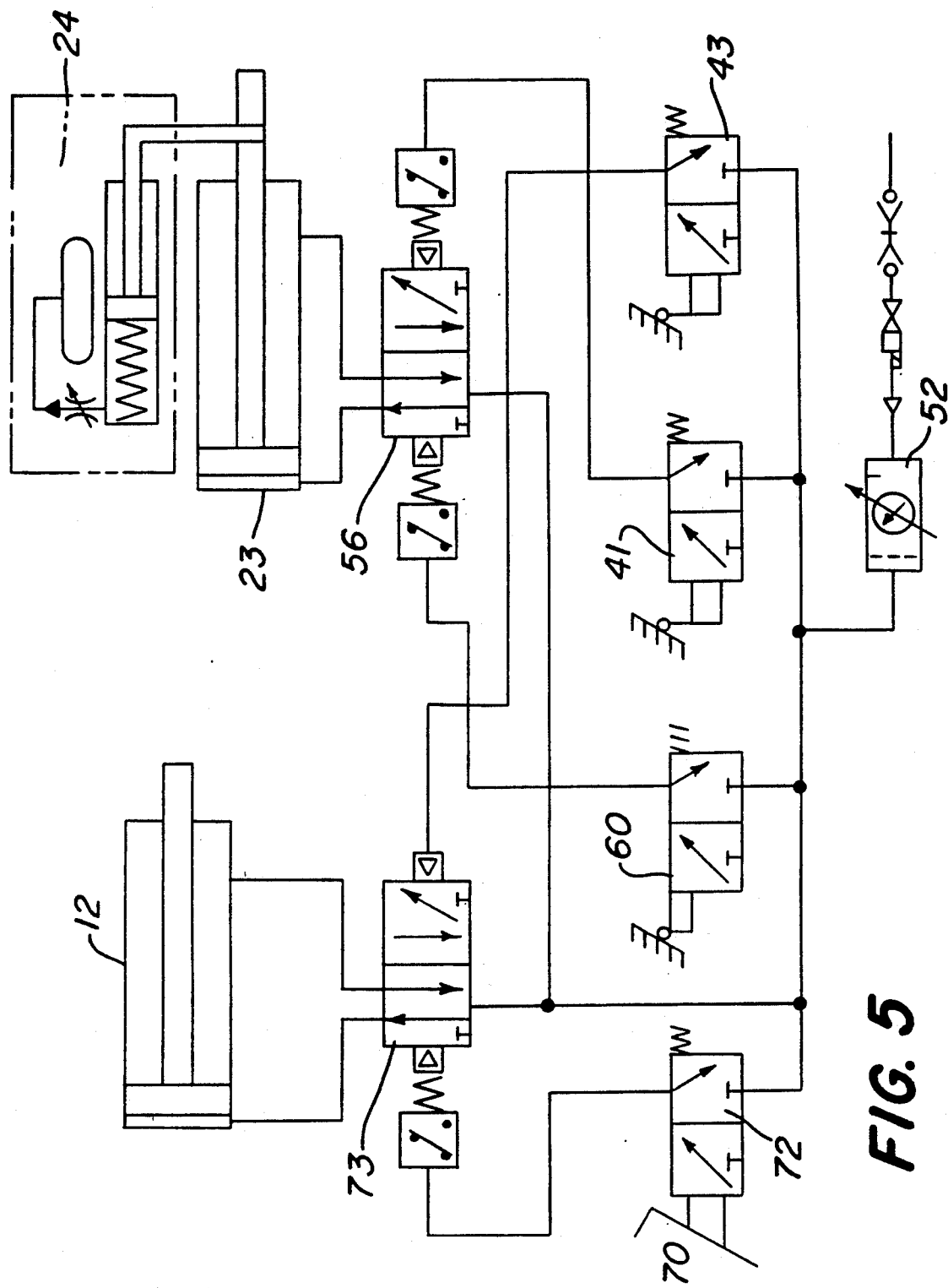
FIG. 5 is a pneumatic circuit diagram of the present invention.

Referring now to FIG. 5, the actuating cylinders and pneumatic circuit is shown diagrammatically. Foot pedal 70 actuates valve means 72 which open the air supply from regulated supply means 52 thereby directing air to impulse valve 73 which opens the air supply to clamp cylinder 12. Valve 60 is mechanically actuated by the closing of clamp jaw and activates impulse valve 56 which supplies air to spindle advanced cylinder 23 moving the chuck and spindle assembly forward toward the workpiece. At the chuck's point of full advancement, reversing valve 41 is actuated by the advance plate which directs air to actuate advance cylinder 23 in the opposite direction, thereby retracting the chuck and spindle assembly. The motion of cylinder 23 is controlled by advance regulator 24. When the chuck and spindle assembly returns fully to its home position, valve 43 is actuated by the advance plate in the other direction. Valve 43 supplies air to clamp cylinder 12, opening the clamp and releasing the workpiece, thus completing the operating cycle.

OPERATION

Figure 6:
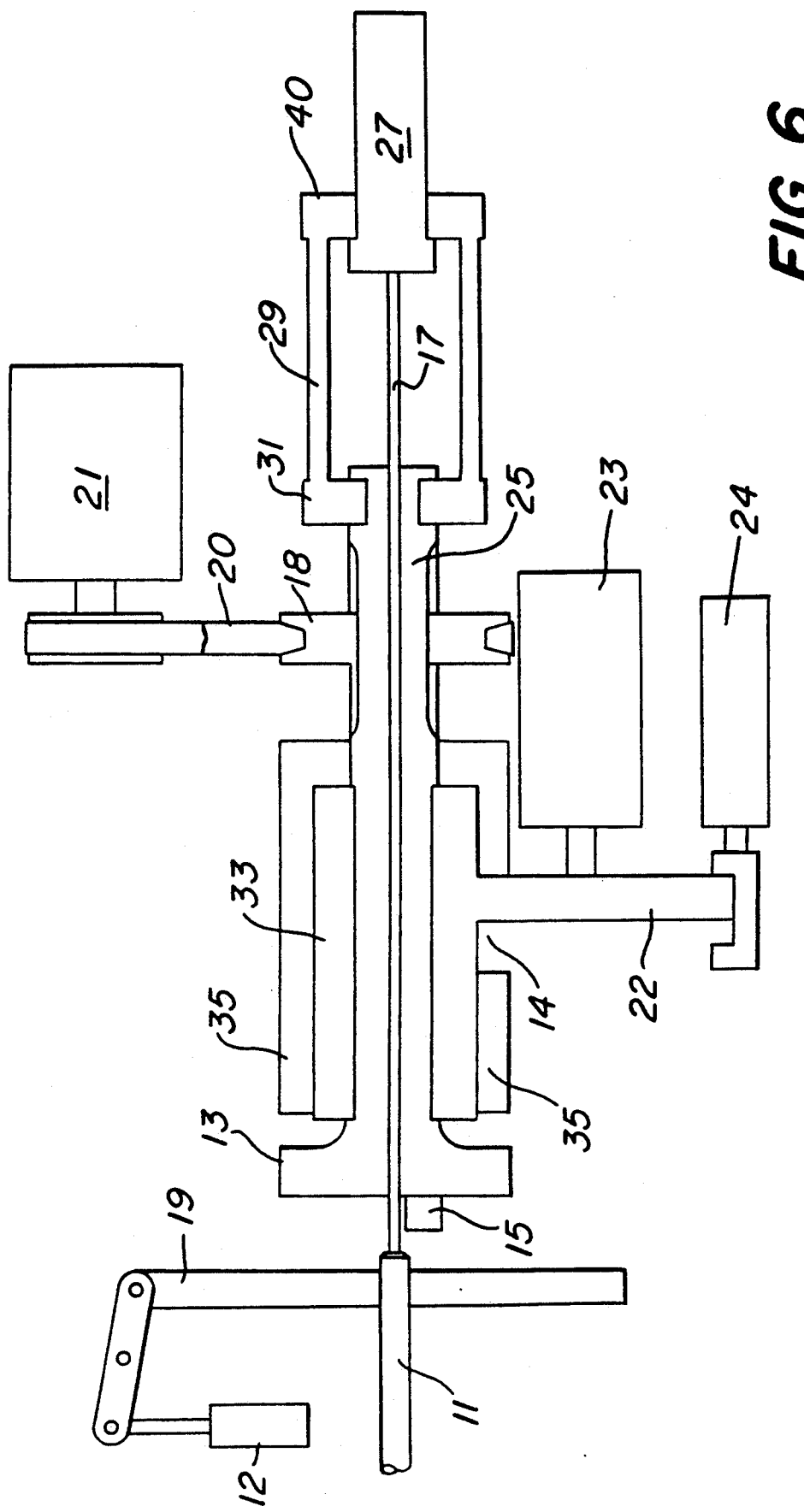
FIG. 6 is a mechanical diagram of the major operating components of the present invention.

The operation of the present invention may be further described by the following steps in reference to the simplified mechanical diagram shown in FIG. 6. A rod-shaped workpiece 11 is first clamped and held stationary having its longitudinal axis co-linear with the rotational axis of the chuck 13 and cutting tool 15. As the workpiece is inserted into the clamp 19, it is positioned in abutting relationship to the end of the stamping rod 17 to locate its depth of insertion within the clamp. After clamping, the chuck and cutting tool are rotated by motor means and are moved forward by advance means 23 connected to the spindle. 25, cutting an angled chamfer into the peripheral end edges of the workpiece 11. Thrust collar 33 which axially retains the chuck and spindle assembly moves slideably within housing 35. Access to the thrust collar for mechanical linkage to advance means 23 is made through slot 14. As the chuck and cutting tool advance, impact unit 27 is compressed by the movement of yoke 29 attached to the spindle 25 by a thrust bearing 31. When the chuck has reached its full axial advancement, stored energy within the impact unit is released and it hammers the end of the stamping rod 17, thus forming the desired imprinting of an identifying indicia into the end face of the workpiece. After it is fully advanced, the chuck is retracted to its home position and the work-holding clamp is released, thus completing the cycle.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A metalworking machine for stamping the ends of metal rods, comprising:

a base;

a rod-like workpiece releaseably affixed to said base;

a hollow spindle rotatably affixed to said base having an axial bore;

a chuck mounted on one end of said spindle and having an axial bore and an axis of rotation co-linear with, the longitudinal axis of said workpiece;

a cutting tool mounted in said chuck;

drive means for rotating said spindle;

a stamping rod slideably held within said spindle bore, said stamping rod including indicia imprint means on one end;

impact means affixed to said base acting upon said stamping rod; and advance means affixed to said base which moves said tool relative to said workpiece, whereby said advance means causes the tool to cut the workpiece, and the impact means forcibly drives the stamping rod forward, thereby producing an identification mark in the end of the workpiece.

2. The metalworking machine of claim 1, wherein said impact means is located beyond a second end of said spindle and acts upon a second end of said stamping rod.

3. The metalworking machine of claim 1, wherein said workpiece is affixed to said base by a clamp which opens and closes about said workpiece.

4. The metalworking machine of claim 3, wherein said clamp and said advance means are synchronized such that the chuck advancement is initiated only when the clamp is closed and thereafter the clamp is opened only when the chuck has retracted to a home position.

5. The metalworking machine of claim 4, where said workpiece is placed and clamped in abutment with the indicia imprint means and where there is no clearance between the stamping rod and the impact means, thereby the stamping rod functions as a stop to position the depth of the workpiece in the clamp.

6. The metalworking machine of claim 5, wherein the clamp has cylindrical sidewalls which center and hold the workpiece co-axial with the chuck.

7. The metalworking machine of claim 6, further including an advance regulator connected to the advance means to control the speed of chuck advancement.

8. The metalworking machine of claim 7, wherein said advance means is mechanically linked to the impact means by a yoke which compresses the impact means as the chuck is moved forward.

9. The metalworking machine of claim 8, wherein said cutting tool causes the end of said workpiece to be chamfered.

10. The metalworking machine of claim 9, wherein said advance means is a pneumatic cylinder.

11. The metalworking machine of claim 10, further including a pneumatic reversing valve which is mechanically actuated by the advance cylinder at the point of maximum advancement of the chuck.

12. A metalworking machine for stamping the ends of metal rods, comprising:

a base;

a releasable clamp affixed to said base holding a rod-like workpiece in a fixed, stationary position;

a hollow spindle rotatably and slideably affixed to said base having an axial throughbore;

a chuck mounted on one end of said spindle and having an axial bore and an axis of rotation co-linear with the longitudinal axis of said workpiece;

a cutting tool mounted in said chuck;

drives means for rotating said spindle;

a stamping rod slideably held within said spindle throughbore, said stamping rod including indicia imprint means on a first end;

impact means affixed to said base beyond a second end of said spindle and acting upon a second end of said stamping rod; and advance means affixed between said base and said spindle which moves said chuck back and forth, whereby said advancement means causes the tool to cut the workpiece, and at a pre-selected point of advancement triggers the impact means to forcibly drive the stamping rod forward, thereby producing an identification mark in the end of the workpiece.

* * * * *